United States Patent
Sedlacek et al.

(10) Patent No.: US 9,800,404 B2
(45) Date of Patent: Oct. 24, 2017

(54) CONFIGURATION OF LIVENESS CHECK USING INTERNET KEY EXCHANGE MESSAGES

(71) Applicant: Telefonaktiebolaget L M Ericsson (publ), Stockholm (SE)

(72) Inventors: Ivo Sedlacek, Hovorcovice (CZ); Rikard Eriksson, Jörlanda (SE); Ralf Keller, Würselen (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 14/441,684

(22) PCT Filed: Mar. 25, 2015

(86) PCT No.: PCT/SE2015/050357
§ 371 (c)(1),
(2) Date: May 8, 2015

(87) PCT Pub. No.: WO2016/153402
PCT Pub. Date: Sep. 29, 2016

(65) Prior Publication Data
US 2016/0285627 A1    Sep. 29, 2016

(51) Int. Cl.
*H04L 9/32* (2006.01)
*H04L 9/08* (2006.01)
(Continued)

(52) U.S. Cl.
CPC .......... *H04L 9/0819* (2013.01); *H04L 9/0841* (2013.01); *H04L 43/00* (2013.01);
(Continued)

(58) Field of Classification Search
CPC ..... H04L 9/0819; H04L 43/00; H04L 63/164; H04L 67/145; H04L 69/28; H04W 12/04; H04W 76/022; H04W 80/04
See application file for complete search history.

(56) References Cited

U.S. PATENT DOCUMENTS 6,976,071 B1 * 12/2005 Donzis ............... H04L 43/0811
                                              709/224
8,656,481 B2 *  2/2014 Cheng .................. H04L 63/164
                                              713/151
(Continued)

FOREIGN PATENT DOCUMENTS

EP    2 362 688 A1    8/2011

OTHER PUBLICATIONS

3GPP, Technical Specification, "3rd Generation Partnership Project; Technical Specification Group Services and System Aspects; 3GPP System Architecture Evolution (SAE); Security aspects of non-3GPP accesses (Release 12)", 3GPP TS 33.402 V12.5.0 (Dec. 2014), 56 pp.
(Continued)

*Primary Examiner* — Sharon Lynch
(74) *Attorney, Agent, or Firm* — Sage Patent Group

(57) ABSTRACT

There is provided mechanisms for configuration of liveness check using Internet key exchange messages. A method is performed by a user equipment. The method comprises transmitting, to a core network node, a first Internet key exchange message comprising a configuration attribute indicating support of receiving a timeout period for liveness check. The method comprises receiving, from the core network node, a second Internet key exchange message comprising a configuration attribute indicating a timeout period for said liveness check.

24 Claims, 6 Drawing Sheets

(51) Int. Cl.
| | |
|---|---|
| *H04L 29/06* | (2006.01) |
| *H04W 12/04* | (2009.01) |
| *H04W 76/02* | (2009.01) |
| *H04L 29/08* | (2006.01) |
| *H04L 12/26* | (2006.01) |
| *H04W 80/04* | (2009.01) |
| *H04L 1/18* | (2006.01) |

(52) U.S. Cl.
CPC .......... *H04L 63/164* (2013.01); *H04L 67/145* (2013.01); *H04L 69/28* (2013.01); *H04W 12/04* (2013.01); *H04W 76/022* (2013.01); *H04L 1/188* (2013.01); *H04L 63/162* (2013.01); *H04W 80/04* (2013.01)

(56) References Cited

U.S. PATENT DOCUMENTS

| | | | | |
|---|---|---|---|---|
| 2002/0143946 A1* | 10/2002 | Crosson | ............ | H04L 29/12009 709/226 |
| 2004/0162983 A1* | 8/2004 | Gotoh | .................. | H04L 9/0841 713/171 |
| 2006/0203787 A1* | 9/2006 | Grech | ............... | H04L 29/12216 370/338 |
| 2007/0140159 A1* | 6/2007 | Eronen | .................... | H04L 12/12 370/328 |
| 2008/0062863 A1* | 3/2008 | Ginde | ..................... | H04L 12/66 370/221 |
| 2008/0172582 A1* | 7/2008 | Sinicrope | .............. | H04L 63/164 714/48 |
| 2009/0034431 A1* | 2/2009 | Nagarajan | ........... | H04L 12/4666 370/254 |
| 2010/0157926 A1* | 6/2010 | Eronen | ............. | H04L 29/12471 370/329 |
| 2011/0066858 A1* | 3/2011 | Cheng | .................. | H04L 63/164 713/171 |
| 2011/0214166 A1* | 9/2011 | Vinayakray-Jani | ... | H04L 63/061 726/5 |
| 2011/0261787 A1* | 10/2011 | Bachmann | ........... | H04L 63/029 370/331 |
| 2012/0078998 A1* | 3/2012 | Son | ..................... | H04L 63/0272 709/203 |
| 2012/0230329 A1* | 9/2012 | Morris | ................... | H04L 69/16 370/389 |
| 2013/0058275 A1* | 3/2013 | Melia | .................. | H04W 60/005 370/328 |
| 2014/0177434 A1* | 6/2014 | Cartmell | ............. | H04L 41/0668 370/221 |
| 2015/0288765 A1* | 10/2015 | Skraparlis | ........... | H04L 12/4641 709/228 |
| 2016/0021194 A1* | 1/2016 | Prabhakar | ............. | H04L 67/143 709/204 |
| 2016/0248730 A1* | 8/2016 | Iyer | ..................... | H04L 61/2015 |

OTHER PUBLICATIONS

3GPP, Technical Specification, "3rd Generation Partnership Project; Technical Specification Group Core Network and Terminals; Access to the 3GPP Evolved Packet Core (EPC) via non-3GPP access networks; Stage 3 (Release 13)", 3GPP TS 24.302 V13.0.0 (Dec. 2014), 104 pp.

Huang et al., "A Traffic-Based Method of Detecting Dead Internet Key Exchange (IKE) Peers", Network Working Group, Request for Comments: 3706, Category: Informational, Feb. 2004, 13 pp.

Kaufman et al., "Internet Key Exchange Protocol Version 2 (IKEv2)", Internet Engineering Task Force (IETF), Request for Comments: 5996, Category: Standards Track, Sep. 2010, 138 pp.

3GPP TS 24.302, V12.7.0, Access to the 3GPP Evolved Packet Core (EPC) via non-3GPP access networks; Stage 3 (Release 12); Dec. 19, 2014, retrieved from the internet at URL http://www.3gpp.org/ftp/Specs/ 2014-12/Rel-12/24_series.

Huang et al. "A Traffic-Based Method of Detecting Dead Internet Key Exchange (IKE) Peers", Network Working Group, Request for Comments: 3706, Category: Informational, Feb. 2004, 13 Pages.

International Search Report and Written Opinion Corresponding to International Application No. PCT/SE2015/050357; Date of Mailing: Dec. 11, 2015; 11 Pages.

Zte et al. "IKEv2 extension for P-CSCF restoration over untrusted WLAN", 3GPP TSG-CT WG1 Meeting #93, C1-152604, Vancouver, Canada, Aug. 17-21, 2015, 9 Pages.

Written Opinion of the International Preliminary Examining Authority Corresponding to International Application No. PCT/SE2015/050357; Date of Mailing: Feb. 21, 2017; 5 Pages.

* cited by examiner

CONFIGURATION OF LIVENESS CHECK USING INTERNET KEY EXCHANGE MESSAGES

CROSS REFERENCE TO RELATED APPLICATION

This application is a 35 U.S.C. §371 national stage application of PCT International Application No. PCT/SE2015/050357, filed on 25 Mar. 2015, the disclosure and content of which is incorporated by reference herein in its entirety.

TECHNICAL FIELD

Embodiments presented herein relate to liveness check, and particularly to methods, a user equipment, a core network node, computer programs, and a computer program product for configuration of liveness check using Internet key exchange messages.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to provide efficient and reliant liveness check, also called dead peer detection, for example over untrusted non-3GPP access networks, where 3GPP is short for the Third Generation Partnership Program.

Liveness check enables ensuring that both ends of an Internet key exchange (such as Internet key exchange v1, IKEv1, or Internet key exchange v2, IKEv2) security association are alive.

In general terms, a liveness check may involve one endpoint of the Internet key exchange security association sending an informational request message with no payloads (other than the empty encrypted payload required by the syntax) to which the other endpoint of the Internet key exchange security association responds with an informational response message. The protocol according to the IETF (Internet Engineering Task Force) RFC (Request for Comments) 5996 expects that the informational request message is sent periodically, if the endpoint has not received any cryptographically protected Internet protocol security (IPSec) or Internet key exchange packet as part of the Internet key exchange security association for a given timeout.

When Internet key exchange is used in an untrusted access network, a user equipment and an evolved packet data gateway (ePDG) act as endpoints of the Internet key exchange security association.

The ePDG can send the informational request message to monitor the liveness of the user equipment, but this requires timers in the ePDG.

The user equipment can send the informational request message to monitor the liveness of the ePDG, but the operator has no control of what the timeout is. Hence, there is a limited possibility for the network to control the actual usage of liveness check from the user equipment.

Hence, there is a need for an improved liveness check of user equipment.

SUMMARY

An object of embodiments herein is to provide efficient liveness check of user equipment.

According to a first aspect there is presented a method for configuration of liveness check using Internet key exchange messages. The method is performed by a user equipment, e.g. a UE. The method comprises transmitting, to a core network node, a first Internet key exchange message comprising a configuration attribute indicating support of receiving a timeout period for liveness check. The method comprises receiving, from the core network node, a second Internet key exchange message comprising a configuration attribute indicating a timeout period for said liveness check.

Advantageously this provides efficient liveness check in the user equipment.

Advantageously this enables dynamic control of the user equipment usage of liveness check from the core network node.

Advantageously this enables controlling the timeout period used by the user equipment performing its part the liveness check According to a second aspect there is presented a user equipment for configuration of liveness check using Internet key exchange messages. The user equipment comprises a processing unit. The processing unit is configured to cause the user equipment to transmit, to a core network node, a first Internet key exchange message comprising a configuration attribute indicating support of receiving a timeout period for liveness check. The processing unit is configured to cause the user equipment to receive, from the core network node, a second Internet key exchange message comprising a configuration attribute indicating a timeout period for the liveness check.

According to a third aspect there is presented a computer program for configuration of liveness check using Internet key exchange messages, the computer program comprising computer program code which, when run on a processing unit of a user equipment, causes the user equipment to perform a method according to the first aspect.

According to a fourth aspect there is presented a method for configuration of liveness check using Internet key exchange messages. The method is performed by a core network node. The method comprises receiving, from a user equipment, a first Internet key exchange message comprising a configuration attribute indicating support of receiving a timeout period for liveness check. The method comprises transmitting, to the user equipment, a second Internet key exchange message comprising a configuration attribute indicating a timeout period for the liveness check.

According to a fifth aspect there is presented a core network node for configuration of liveness check using Internet key exchange messages. The core network node comprises a processing unit. The processing unit is configured to cause the core network node to receive, from a user equipment, a first Internet key exchange message comprising a configuration attribute indicating support of receiving a timeout period for liveness check. The processing unit is configured to cause the core network node to transmit, to the user equipment, a second Internet key exchange message comprising a configuration attribute indicating a timeout period for the liveness check.

According to an embodiment the core network node is an Evolved Packet Data Gateway (ePDG).

According to a sixth aspect there is presented a computer program for configuration of liveness check using Internet key exchange messages, the computer program comprising computer program code which, when run on a processing unit of a core network node, causes the core network node to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
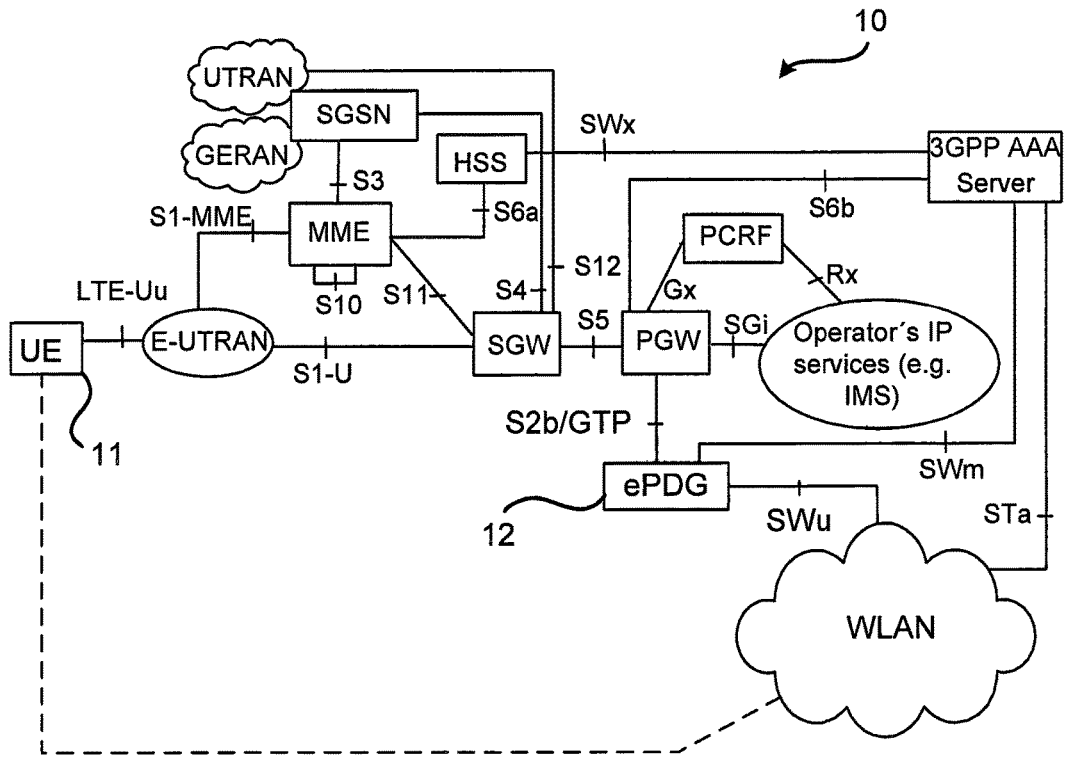
FIG. 1 is a schematic diagram illustrating a communication network according to embodiments.

FIG. 1 shows a schematic overview of an exemplifying wireless communications network 10 where embodiments presented herein can be applied. The wireless communications network 10 of FIG. 1 is Long Term Evolution (LTE) based. It should be pointed out that the terms "LTE" and "LTE based" are here used to comprise both present and future LTE based networks, such as, for example, advanced LTE networks. It should be appreciated that although FIG. 1 shows an LTE based communications network, the example embodiments herein may also be utilized in connection with other wireless communications networks, such as, e.g., Global System for Communication (GSM) or Universal Mobile Telecommunications System (UMTS), comprising nodes and functions that correspond to the nodes and functions of the network in FIG. 1.

The wireless communications network comprises one or more base stations in the form of eNodeBs, operatively connected to a Serving Gateway (SGW), in turn operatively connected to a Mobility Management Entity (MME) and a Packet Data Network Gateway (PGW), which in turn is operatively connected to a Policy and Charging Rules Function (PCRF). The eNodeB is a radio access node that interfaces with the user equipment 11. The eNodeBs of the network form the so called Evolved Universal Terrestrial Radio Access Network (E-UTRAN) for communicating with the user equipment over an air interface, such as LTE-Uu. The core network in LTE is known as Evolved Packet Core (EPC), and the EPC together with the E-UTRAN is referred to as Evolved Packet System (EPS). The SGW routes and forwards user data packets over the S1-U interface, whilst also acting as the mobility anchor for the user plane during inter-eNodeB handovers and as the anchor for mobility between LTE and other 3rd Generation Partnership Project (3GPP) technologies (terminating S4 interface and relaying the traffic between 2G/3G systems and PGW). For idle state user equipment, the SGW terminates the downlink data path and triggers paging when downlink data arrives for the user equipment, and further manages and stores user equipment contexts, e.g. parameters of the IP bearer service, network internal routing information. The SGW communicates with the MME via interface S11 and with the PGW via the S5 interface. Further, the SGW may communicate via the S12 interface with NodeBs of the Universal Terrestrial Radio Access Network (UTRAN) and with Base Station Transceivers (BTSs) of the GSM EDGE ("Enhanced Data rates for GSM Evolution") Radio Access Network (GERAN).

The MME is responsible for idle mode user equipment tracking and paging procedure including retransmissions. It is involved in the bearer activation/deactivation process and is also responsible for choosing the SGW for a user equipment at the initial attach and at time of intra-LTE handover involving core network node relocation. It is responsible for authenticating the user by interacting with the Home Subscriber Server (HSS). The Non-Access Stratum (NAS) signaling terminates at the MME and it is also responsible for generation and allocation of temporary identities to user equipment via the S1-MME interface. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. The MME also provides the control plane function for mobility between LTE and 2G/3G access networks with the S3 interface terminating at the MME from the Serving General Packet Radio Service (GPRS) Support Node (SGSN). The MME also terminates the S6a interface towards the home HSS for roaming user equipment. Further, there is an interface S10 configured for communication between MMEs for MME relocation and MME-to-MME information transfer.

The PGW provides connectivity to the user equipment to external packet data networks (PDNs) by being the point of exit and entry of traffic for the user equipment. A user equipment may have simultaneous connectivity with more than one PGW for accessing multiple PDNs. The PGW performs policy enforcement, packet filtering for each user, charging support, lawful Interception and packet screening. Another role of the POW is to act as the anchor for mobility between 3GPP and non-3GPP technologies such as WiMAX and 3GPP2 (CDMA 1× and EvDO). The interface between the PGW and the packet data network, being for instance the Internet, is referred to as the SGi. The packet data network may be an operator external public or private packet data network or an intra operator packet data network, e.g. for provision of IP Multimedia Subsystem (IMS) services.

The PCRF determines policy rules in real-time with respect to the user equipment of the network. This may e.g. include aggregating information in real-time to and from the core network and operational support systems, etc. of the network so as to support the creation of rules and/or automatically making policy decisions for user equipment currently active in the network based on such rules or similar. The PCRF provides the PGW with such rules and/or policies or similar to be used by the acting PGW as a Policy and Charging Enforcement Function (PCEF) via interface Gx. The PCRF further communicates with the packet data network via the Rx interface.

One main function of the Evolved Packet Data Gateway (ePDG) 12 is to secure the data transmission with a user equipment connected to the EPC over an untrusted non-3GPP access. For this purpose, the ePDG acts as a termination node of IPsec tunnels established with the user equipment.

The 3GPP AAA server is located within the 3GPP Home Public Land Mobile Network (HPLMN). It performs Authentication, Authorization, and Accounting (AAA) functions and may also act as an AAA proxy server. For WLAN 3GPP IP Access it provides authorization, policy enforcement and routing information to the PDG, WLAN Access Gateway and WLAN access network.

As noted above, the user equipment can send the informational request message to monitor the liveness of the ePDG, but the operator has no control of what the timeout is. Hence, there is a limited possibility for the network to control the actual usage of liveness check from the user equipment.

It may be useful to enable a node in the network to configure the user equipment regarding how to send informational request messages with a timeout specified by network. This would enable the network to dynamically control and adapt the usage of the liveness check, for example to avoid unnecessary traffic load on the network.

Furthermore, it may be useful to require the user equipment to send an informational request even if the user equipment receives a cryptographically protected IPSec/IKEv2 packet but does not send any cryptographically protected IPSec/IKEv2 packet as part of the IKEv2 security association for the given timeout. This would remove the requirement to run the timers for the liveness check in a core network node, such as an ePDG, and instead rely on the user equipment sending a cryptographically protected IPSec/IKEv2 packet within the given timeout (either an IKEv2/IPSec packet or the informational request).

As noted above, the ePDG can send the informational request message to monitor the liveness of the user equipment, but this requires timers in the ePDG.

Similar issues exist in IKEv1, where Dead Peer Detection protocol according to IETF (Internet Engineering Task Force) RFC (Request for Comments) 3706 is used to detect liveness check of the peer. Instead of sending an IKEv2 INFORMATIONAL request message, RFC3706-defined R-U-THERE message may be sent. Instead of sending an IKEv2 INFORMATIONAL response message, an RFC3706-defined R-U-THERE-ACK message may be sent.

The embodiments disclosed herein thus relate to liveness check using Internet key exchange messages. In order to obtain such liveness check there is provided a user equipment, a method performed by the user equipment, a computer program comprising code, for example in the form of a computer program product, that when run on a processing unit of the user equipment, causes the user equipment to perform the method. In order to obtain such liveness check there is further provided a core network node, such as an ePDG, a method performed by the core network node, and a computer program comprising code, for example in the form of a computer program product, that when run on a processing unit of the core network node, causes the core network node to perform the method.

Figure 2A:
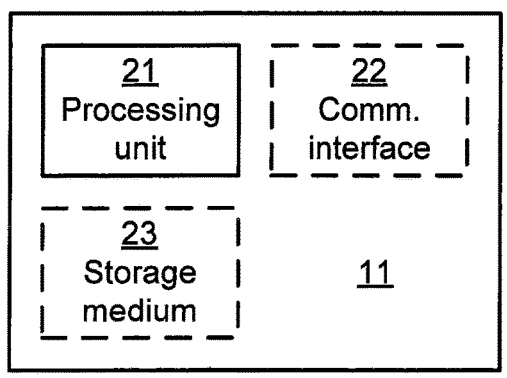
FIG. 2a is a schematic diagram showing functional units of a user equipment, UE, according to an embodiment.

FIG. 2a schematically illustrates, in terms of a number of functional units, the components of a user equipment 11 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The user equipment may further comprise a communications interface 22 for communications with nodes, devices, user equipment, and logical entities in the network. As such the communications interface 22 may comprise one or more transmitters and receivers, comprising analogue and digital components and a suitable number of antennas for wireless communications. The processing unit 21 controls the general operation of the user equipment e.g. by sending data and control signals to the communications interface 22 and the storage medium 23, by receiving data and reports from the communications interface 22, and by retrieving data and instructions from the storage medium 23. Other components, as well as the related functionality, of the user equipment are omitted in order not to obscure the concepts presented herein. In general terms, the user equipment may be a wireless devices, such as a portable wireless device, and be provided as a mobile station, a mobile phone, a handset, a wireless local loop phone, a smartphone, a laptop computer, a tablet computer, a wireless modem, a sensor, or a Internet-of-Things device.

Figure 2B:
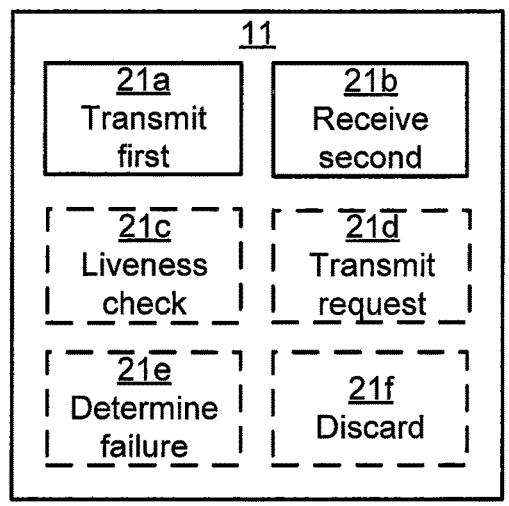
FIG. 2b is a schematic diagram showing functional modules of a user equipment according to an embodiment.

FIG. 2b schematically illustrates, in terms of a number of functional modules, the components of a user equipment 11 according to an embodiment. The user equipment of FIG. 2b comprises a number of functional modules; a transmit first module 21a configured to perform below step S102, and a receive second module 21b configured to perform below step S104. The user equipment 11 of FIG. 2b may further comprises a number of optional functional modules, such as any of a liveness check module 21c configured to perform below step S106, a transmit request module 21d configured to perform below step S108, a determine failure module 21e configured to perform below step S110, and a discard module 21f configured to perform below steps S112 and S114. The functionality of each functional module 21a-e will be further disclosed below in the context of which the functional modules 21a-e may be used. In general terms, each functional module 21a-e may be implemented in hardware or in software. Preferably, one or more or all functional modules 21a-e may be implemented by the processing unit 21, possibly in cooperation with functional units 22 and/or 23. The processing unit 21 may thus be arranged to from the storage medium 23 fetch instructions as provided by a functional module 21a-e and to execute these instructions, thereby performing any steps as will be disclosed hereinafter.

Figure 3A:
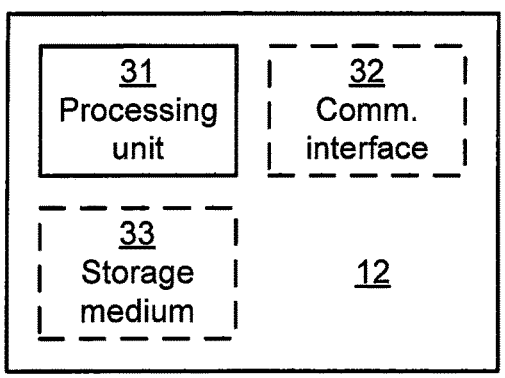
FIG. 3a is a schematic diagram showing functional units of a core network node according to an embodiment.

FIG. 3a schematically illustrates, in terms of a number of functional units, the components of a core network node 12 according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41b (as in FIG. 4), e.g. in the form of a storage medium 83. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The core network node 12 may further comprise a communications interface 32 for communications with nodes, devices, user equipment, and logical entities in the network. As such the communications interface 32 may comprise one or more transmitters and receivers, comprising analogue and digital components and a suitable number of antennas for wireless communications and/or ports for wireline communications. The processing unit 31 controls the general operation of the core network node 12 e.g. by sending data and control signals to the communications interface 32 and the storage medium 33, by receiving data and reports from the communications interface 32, and by retrieving data and instructions from the storage medium 33. Other components, as well as the related functionality, of the core network node 12 are omitted in order not to obscure the concepts presented herein. According to an embodiment the core network node is an Evolved Packet Data Gateway (ePDG).

Figure 3B:
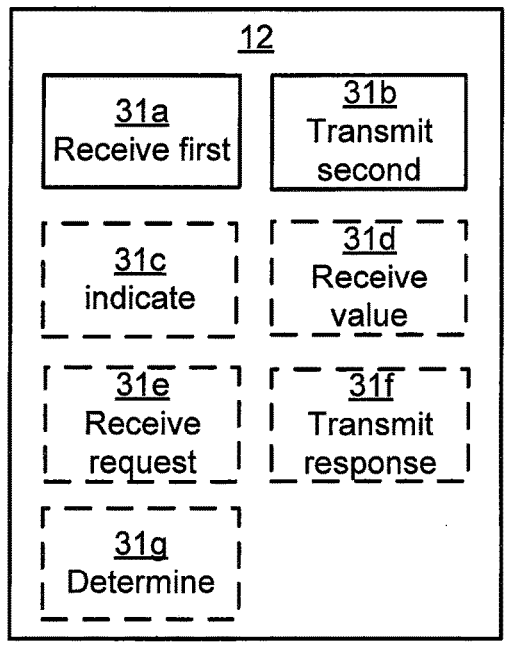
FIG. 3b is a schematic diagram showing functional modules of a core network node according to an embodiment.

FIG. 3b schematically illustrates, in terms of a number of functional modules, the components of a core network node 12 according to an embodiment. The core network node 12 of FIG. 3b comprises a number of functional modules; a receive first module 31a configured to perform below step S202, and a transmit second module 31b configured to perform below step S210. The core network node 12 of FIG. 3b may further comprises a number of optional functional modules, such as any of an indicate module 31c configured to perform below step S206, a receive value module 31d configured to perform below step S208, a receive request module 31e configured to perform below step S212, a transmit response module 31f configured to perform below step S214, and a determine module 31g configured to perform below step S204. The functionality of each functional module 31a-g will be further disclosed below in the context of which the functional modules 31a-g may be used. In general terms, each functional module 31a-g may be implemented in hardware or in software. Preferably, one or more or all functional modules 31a-g may be implemented by the processing unit 31, possibly in cooperation with functional units 32 and/or 33. The processing unit 31 may thus be arranged to from the storage medium 33 fetch instructions as provided by a functional module 31a-g and to execute these instructions, thereby performing any steps as will be disclosed hereinafter.

Figure 4:
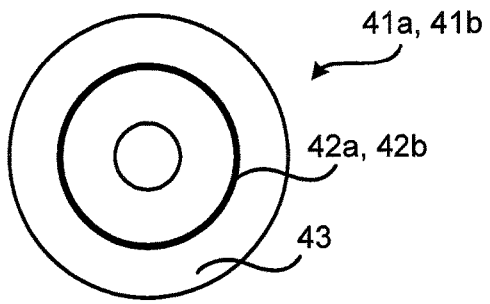
FIG. 4 shows one example of a computer program product comprising computer readable means according to an embodiment.

FIG. 4 shows one example of a computer program product 41a, 41b comprising computer readable means 43. On this computer readable means 43, a computer program 42a can be stored, which computer program 42a can cause the processing unit 21 and thereto operatively coupled entities and devices, such as the communications interface 22 and the storage medium 23, to execute methods according to embodiments described herein. The computer program 42a and/or computer program product 41a may thus provide means for performing any steps of the user equipment as herein disclosed. On this computer readable means 43, a computer program 42b can be stored, which computer program 42b can cause the processing unit 31 and thereto operatively coupled entities and devices, such as the communications interface 32 and the storage medium 33, to execute methods according to embodiments described herein. The computer program 42b and/or computer program product 41b may thus provide means for performing any steps of the core network node as herein disclosed.

In the example of FIG. 4, the computer program product 41a, 41b is illustrated as an optical disc, such as a CD (compact disc) or a DVD (digital versatile disc) or a Blu-Ray disc. The computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 42a, 42b is here schematically shown as a track on the depicted optical disk, the computer program 42a, 42b can be stored in any way which is suitable for the computer program product 41a, 41b.

Figure 5:
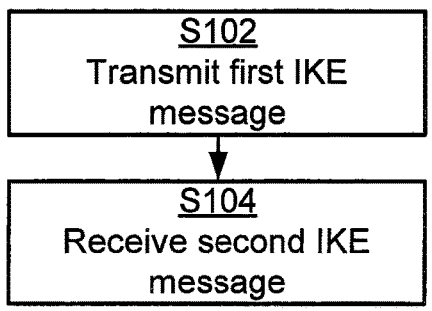
FIGS. 5, 6, 7, and 8 are flowcharts of methods according to embodiments.
Figure 7:
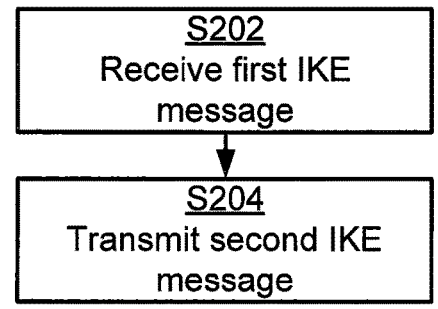
Figure 6:
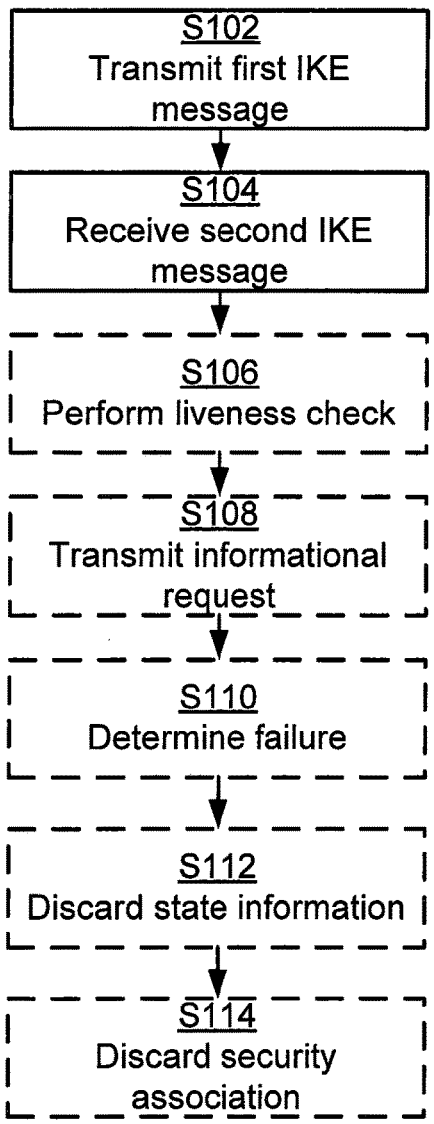
Figure 8:
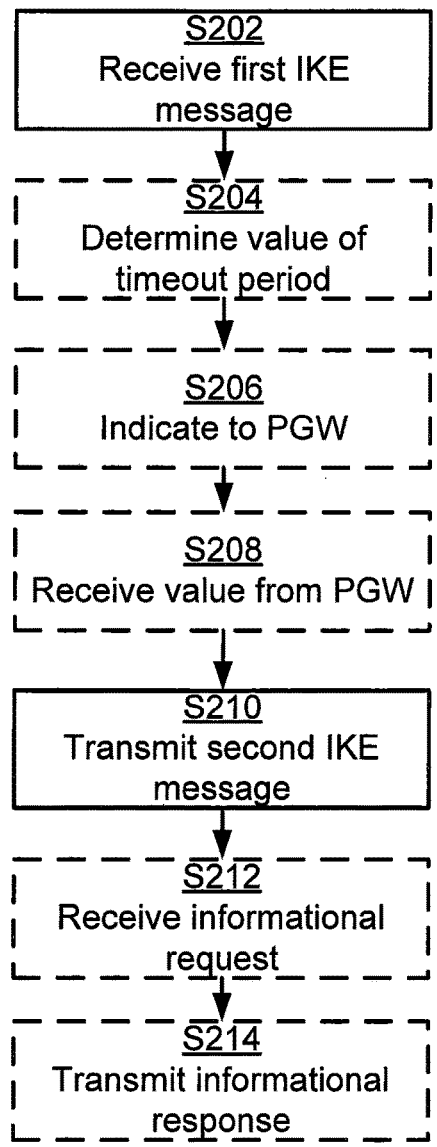

FIGS. 5 and 6 are flow charts illustrating embodiments of methods for configuration of liveness check using Internet key exchange messages as performed by the user equipment 11. FIGS. 7 and 8 are flow charts illustrating embodiments of methods for configuration of liveness check using Internet key exchange messages as performed by the core network node 11. The methods are advantageously provided as computer programs 42a, 42b.

Reference is now made to FIG. 5 illustrating a method for configuration of liveness check using Internet key exchange messages as performed by the user equipment 11 according to an embodiment.

The user equipment is configured to, in a step S102, transmit, to a core network node, a first Internet key exchange message. The first Internet key exchange message comprises a configuration attribute indicating support of receiving a timeout period for liveness check.

As will be further disclosed below, this message is assumed to be received by core network node, which, in turn, responds to this message. Hence, the user equipment is configured to, in a step S104, receive, from the core network node, a second Internet key exchange message. The second Internet key exchange message comprises a configuration attribute indicating a timeout period for the liveness check.

Embodiments relating to further details of liveness check using Internet key exchange messages as performed by the user equipment 11 will now be disclosed.

There may be different ways to provide the first Internet key exchange message and the second Internet key exchange message. Embodiments relating thereto will now be described in turn. According to an embodiment the first Internet key exchange message is an IKE_AUTH request message. According to an embodiment the second Internet key exchange message is an IKE_AUTH response message.

There may be different ways to provide the configuration attribute indicating support of receiving a timeout period for liveness check and the configuration attribute indicating support of receiving a timeout period for liveness check. Embodiments relating thereto will now be described in turn. According to an embodiment the configuration attribute indicating support of receiving a timeout period for liveness check is a timeout period for liveness check attribute with length field set to zero. According to an embodiment the configuration attribute indicating support of receiving a timeout period for liveness check is provided in a CFG_REQUEST configuration payload. According to an embodiment the configuration attribute indicating a timeout period for said liveness check is a timeout period for liveness check attribute with a timeout period field. According to an embodiment the configuration attribute indicating a timeout period for said liveness check is provided in a CFG_REPLY configuration payload.

The configuration attribute indicating a timeout period for the liveness check may be based on a local policy. Alternatively, the configuration attribute indicating a timeout period for the liveness check is based on information from a configuration system or management system. Further details thereof will be provided below.

Reference is now made to FIG. 6 illustrating methods for configuration of liveness check using Internet key exchange messages as performed by the user equipment 11 according to further embodiments.

The first Internet key exchange message may be transmitted in an Internet key exchange version 2 (IKEv2) message, and the second Internet key exchange message may be received in an IKEv2 message. In more detail, in one embodiment, if the UE supports the capability of being configured for the liveness check, the UE includes an IKEv2 configuration attribute indicating capability of being configured for the liveness check in an IKEv2 message sent to the core network node 12. In this embodiment, if the UE supports capability of being configured for the liveness check, and the IKEv2 configuration attribute indicating timeout period for the liveness check in the received IKEv2 message, then the UE performs the liveness check according to the value of this IKEv2 configuration attribute. Hence, the user equipment may be configured to, in a step S106, perform the liveness check according to the configuration attribute indicating a timeout period for the liveness check.

In one embodiment the IKEv2 configuration attribute further comprises an indication whether the UE is required to send an IKEv2 INFORMATIONAL request also when the UE receives a cryptographically protected Internet protocol security (IPSec) or IKEv2 packet over the given timeout but does not sent any cryptographically protected IPSec/IKEv2 packet as part of the IKEv2 security association for the given timeout. The configuration attribute of the second Internet key exchange message may comprises an indication whether the user equipment is required to transmit an informational request or not also if the user equipment receives at least one of a cryptographically protected IPSec packet and a cryptographically Internet key exchange packet during the timeout period. The informational request may be included in IKEv2 INFORMATIONAL request message.

The liveness check may be part of an Internet key exchange security association, and the user equipment does not transmit any cryptographically protected IPSec packet or cryptographically Internet key exchange packet as part of the Internet key exchange security association during said timeout period. Hence, the user equipment may be configured to, in a step S108, transmit an informational request with no payload if a timeout period for liveness check attribute is included in the received configuration attribute indicating a timeout period for said liveness check, and in absence of receiving a cryptographically protected IPSec packet or a cryptographically Internet key exchange packet during the timeout period for the liveness check.

In embodiments where the liveness check is part of an Internet key exchange security association, the user equipment is configured to, in absence of receiving an informational response in response to the transmitted informational request with no payload, in a step S110, determine failure of the Internet key exchange security association. The user equipment is further configured to, in a step S112, discard any state information associated with the Internet key exchange security association; and/or, in a step S114, discard any IPSec security associations negotiated using the Internet key exchange security association In one embodiment Internet key exchange version 1 (IKEv1) is used together with the Dead Peer Detection protocol (RFC3706). That is, instead of using IKEv2 configuration attributes as disclosed above, new IKEv1 attributes carrying the information are used. That is, according to an embodiment the first Internet key exchange message is transmitted in an IKEv1, message and the second Internet key exchange message is received in an IKEv1 Message.

Further, instead of sending an IKEv2 INFORMATIONAL request message, an RFC3706-defined R-U-THERE message is sent, and instead of sending an IKEv2 INFORMATIONAL response message, an RFC3706-defined R-U-THERE-ACK message is sent. That is, according to an embodiment the configuration attribute of the second Internet key exchange message comprises an indication whether the user equipment is required to transmit an are-you-there message or not also if the user equipment receives at least one of a cryptographically protected IPSec packet and a cryptographically Internet key exchange packet during the timeout period. The are-you-there message may be included in an RFC3706 defined R-U-THERE message.

Reference is now made to FIG. 7 illustrating a method for configuration of liveness check using Internet key exchange messages as performed by the core network node 12 according to an embodiment.

As noted above, the user equipment 11 in step S102 transmits a message to a core network node 12. It is assumed, for purposes of disclosing the herein disclosed inventive concept, that this message is received by a core network node 12. Hence, the core network node is configured to, in a step S202, receive, from a user equipment 11, a first Internet key exchange message comprising a configuration attribute indicating support of receiving a timeout period for liveness check. The core network node 12 responds to this received message. Particularly, the core network node is configured to, in a step S210, transmit, to the user equipment, a second Internet key exchange message comprising a configuration attribute indicating a timeout period for the liveness check.

Embodiments relating to further details of liveness check using Internet key exchange messages as performed by the core network node 12 will now be disclosed.

Reference is now made to FIG. 8 illustrating methods for configuration of liveness check using Internet key exchange messages as performed by the core network node 12 according to further embodiments.

In one embodiment, if the core network node 12 supports the capability of being able to configure the user equipment for the liveness check and an IKEv2 configuration attribute indicating capability of being configured for the liveness check is included in the received IKEv2 message, then the core network node 12 includes an IKEv2 configuration attribute indicating timeout period for the liveness check in an IKEv2 messages sent to the user equipment.

There may be different ways for the core network node 12 to determine the content of the configuration attribute indicating a timeout period. Different embodiments relating thereto will now be described in turn.

For example, the core network node 12 may determine the content of the configuration attribute indicating a timeout period based on a local policy. Hence, according to an embodiment the core network node is configured to, in a step S204, determine, based on a local policy, a value of the timeout period in the configuration attribute indicating a timeout period for the liveness check.

For example, the core network node 12 may determine the content of the configuration attribute indicating a timeout period based on information from other configuration or management system.

For example, the core network node 12 may determine the content of the configuration attribute indicating a timeout period by indicating to a PGW that the core network node supports the capability of being able to configure the user equipment for the liveness check and where the PGW provides, for example via GTP or via PMIP, a value of the configuration attribute to the core network node. Hence, according to an embodiment the core network node is configured to, in a step S206, indicate to a packet data network gateway, PGW, that the core network node supports receiving a timeout period for said liveness check. The core network node may then be configured to, in a step S208, receive, from the PGW, a value of the configuration attribute indicating a timeout period for the liveness check. The value may be received via a general packet radio service tunneling protocol (GTP).

Alternatively, the value may be received via a proxy mobile Internet protocol (PMIP).

Further examples of the configuration attribute indicating support of receiving a timeout period for liveness check will now be disclosed. For example, the configuration attribute indicating support of receiving a timeout period for liveness check may be a timeout period for liveness check attribute with length field set to zero. For example, the configuration attribute indicating support of receiving a timeout period for liveness check may be provided in a CFG_REQUEST configuration payload. For example, the configuration attribute indicating a timeout period for the liveness check may be a timeout period for liveness check attribute with a timeout period field. For example, the configuration attribute indicating a timeout period for the liveness check may be provided in a CFG_REPLY configuration payload.

As noted above for the embodiments relating to the user equipment, in one embodiment the messages are based on IKEv1 used together with the Dead Peer Detection protocol (RFC3706). Such an embodiment is equally applicable to the core network node. Hence, instead of using IKEv2 configuration attributes as herein disclosed, new IKEv1 attributes carrying the information are used. Instead of sending/receiving an IKEv2 INFORMATIONAL request message, an RFC3706-defined R-U-THERE message may be sent/received. Instead of sending/receiving an IKEv2 INFORMATIONAL response message, an RFC3706-defined R-U-THERE-ACK message may be sent/received. Hence, according to an embodiment the core network node is configured to, in a step S212, receive an informational request message from the user equipment; and in response thereto, to, in a step S214, transmit an informational response message to the user equipment. The informational response message may be included in an IKEv2 INFORMATIONAL response message. The informational response message may be included in an RFC3706-defined R-U-THERE-ACK message.

One particular embodiment for configuration of liveness check using Internet key exchange messages based on at least some of the above disclosed embodiments, and on 3GPP TS 24.302, version 13.0.0, section 7.2.2 and 7.4.1., will now be disclosed in detail. The particular embodiment is based on tunnel establishment. In this embodiment the functionality of the core network node is provided in an ePDG.

Once the ePDG has been selected, the user equipment initiates an IPsec tunnel establishment procedure using the IKEv2 protocol according to IETF RFC 5996 and 3GPP TS 33.402, e.g. version 12.5.0, section 8.2.2.

The user equipment sends an IKE_SA_INIT request message to the selected ePDG in order to setup an IKEv2 security association. Upon receipt of an IKE_SA_INIT response, the user equipment sends an IKE_AUTH request message to the ePDG, including the type of IP address (IPv4 address or IPv6 prefix or both) that needs to be configured in an IKEv2 CFG_REQUEST Configuration Payload. If the user equipment requests for both IPv4 address and IPv6 prefix, the user equipment sends two configuration attributes in the CFG_REQUEST Configuration Payload, one configuration attribute for the IPv4 address and one configuration attribute for the IPv6 prefix. The IKE_AUTH request message comprises in the "IDr" payload the APN and in the "IDi" payload the NAI. The user equipment indicates a request for the default APN by omitting IDr payload, which is in accordance with IKEv2 protocol according to IETF RFC 5996. The IKE_AUTH request message may comprise, in a notify payload, an indication that so-called MOBIKE is supported by the user equipment. The user equipment may also include the INTERNAL_IP6_DNS or the INTERNAL_IP4_DNS attribute in the CFG_REQUEST Configuration Payload. The user equipment can obtain zero or more DNS server addressed in the CFG_REPLY payload according to IETF RFC 5996. The user equipment can also include the P-CSCF_IP6_ADDRESS attribute, the P-CSCF_IP4_ADDRESS attribute or both in the CFG_REQUEST configuration payload. The user equipment can obtain zero or more P-CSCF server addresses in the CFG_REPLY configuration payload as specified in IETF draft-gundavelli-ipsecme-3gpp-ims-options. The user equipment can also include the TIMEOUT_PERIOD_FOR_LIVENESS_CHECK attribute as herein disclosed indicating support of receiving timeout period for liveness check in the CFG_REQUEST configuration payload. If the TIMEOUT_PERIOD_FOR_LIVENESS_CHECK attribute as herein disclosed (i.e., indicating the timeout period for the liveness check) is included in the CFG_REPLY configuration payload, the user equipment performs tunnel liveness checks During the IKEv2 authentication and security association establishment, if the user equipment supports explicit indication about the supported mobility protocols, the user equipment provides an indication.

During the IKEv2 authentication and tunnel establishment for initial attach, the user equipment provides an indication about Attach Type, which indicates Initial Attach. To indicate attach due to initial attach, the user equipment includes either the INTERNAL_IP4_ADDRESS or the INTERNAL_IP6_ADDRESS attribute or both in the CFG_REQUEST Configuration Payload within the IKE_AUTH request message. The INTERNAL_IP4_ADDRESS comprises no value and the length field is set to 0 (i.e., zero). The INTERNAL_IP6_ADDRESS comprises no value and the length field is set to 0 (i.e., zero).

During the IKEv2 authentication and tunnel establishment for handover, a user equipment not supporting IP address preservation for NBM indicates Initial Attach as described above.

During the IKEv2 authentication and security association establishment for handover, a user equipment supporting IP address preservation for NBM, provides an indication about Attach Type, which indicates Handover Attach. To indicate attach due to handover, the user equipment includes the previously allocated home address information during the IPSec tunnel establishment. Depending on the IP version, the user equipment includes either the INTERNAL_IP4_ADDRESS or the INTERNAL_IP6_ADDRESS attribute or both in the CFG_REQUEST Configuration Payload within the IKE_AUTH request message to indicate the home address information which is in accordance with the IKEv2 protocol. The user equipment supports IPSec ESP in order to provide secure tunnels between the user equipment and the ePDG.

The user equipment may support multiple authentication exchanges in the IKEv2 protocol in order to support authentication and authorization with an external AAA server allowing the UE to support PAP authentication procedure, or CHAP authentication procedure, or both.

If NBM is used and the user equipment wishes to access an external PDN and therefore needs to perform authentication and authorization with an external AAA server, the user equipment performs the following:

If the IKE_SA_INIT response contains a "MULTIPLE_AUTH_SUPPORTED" Notify payload, then the user equipment includes a "MULTIPLE_AUTH_SUPPORTED" Notify payload in a IKE_AUTH request and performs further authentication steps.

If the IKE_SA_INIT response does not contain a "MULTIPLE_AUTH_SUPPORTED" Notify payload, then user equipment performs the user equipment initiated disconnection. The subsequent user equipment action is implementation dependent (e.g., depending on whether or not a new ePDG is selected).

If NBM is used and if the user equipment receives from the ePDG an IKE_AUTH response message containing a Notify Payload with a Private Notify Message Type PDN_CONNECTION_REJECTION that includes an IP address information in the Notification Data field, the user equipment does not attempt to re-establish this PDN connection whilst being operatively connected to the current ePDG and the user equipment closes the related IKEv2 security association states.

If NBM is used and if the user equipment receives from the ePDG an IKE_AUTH response message containing a Notify Payload with a Private Notify Message Type PDN_CONNECTION_REJECTION and no Notification Data field, the user equipment does not attempt to establish additional PDN connections to this APN while connected to the current ePDG. The user equipment closes the related IKEv2 security association states. Subsequently, the user equipment can attempt to establishment additional PDN connections to the given APN if one or more existing PDN connections to the given APN are released. Whilst being operatively connected to the current ePDG, if this PDN connection is the first PDN connection for the given APN, the user equipment does not attempt to establish a PDN connection to the given APN.

If NBM is used and if the user equipment receives from the ePDG an IKE_AUTH response message comprising a Notify Payload with a Private Notify Message Type MAX_CONNECTION_REACHED, the user equipment does not attempt to establish any additional PDN connections whilst being operatively connected to the current ePDG. The user equipment closes the related IKEv2 security association states. Subsequently, the user equipment can attempt to establishment additional PDN connections if one or more existing PDN connections are released.

After the successful authentication with the 3GPP AAA server, the user equipment receives from the ePDG an IKE_AUTH response message comprising a single CFG_REPLY Configuration Payload including the assigned remote IP address information (IPv4 address or IPv6 prefix). Depending on the used IP mobility management mechanism the following cases can be differentiated:

If DSMIPv6 is used for IP mobility management, the user equipment configures a remote IP address based on the IP address information contained in the INTERNAL_IP4_ADDRESS or INTERNAL_IP6_SUBNET attribute of the CFG_REPLY Configuration Payload. The user equipment uses the remote IP address as Care-of-Address to contact the HA.

If NBM is used for IP mobility management and the user equipment performs an initial attach, the user equipment configures a home address based on the address information from the CFG_REPLY Configuration Payload. Otherwise, if NBM is used and the user equipment performs a handover attach, the user equipment continues to use its IP address configured before the handover, if the address information provided in the CFG_REPLY Configuration Payload does match with the IP address of the user equipment that is configured before the handover. If the IP address of the user equipment does not match with the address information of the CFG_REPLY Configuration Payload, the user equipment configures a new home address based on the IP address information contained in the INTERNAL_IP4_ADDRESS or INTERNAL_IP6_SUBNET attribute of the CFG_REPLY Configuration Payload. In the latter case, IP address preservation is not possible.

If the user equipment supports DSMIPv6, the user equipment may request the HA IP address(es), by including a corresponding CFG_REQUEST Configuration Payload containing a HOME_AGENT_ADDRESS attribute. The HA IP address(es) requested in this attribute are for the APN for which the IPsec tunnel with the ePDG is set-up. In the CFG_REQUEST, the user equipment sets respectively the IPv6 address field and the optional IPv4 address field of the HOME_AGENT_ADDRESS attribute to 0::0 and to 0.0.0.0.

If the user equipment cannot obtain the IP addresses of the HA via IKEv2 signalling, the user equipment uses the home agent address discovery.

In case the user equipment wants to establish multiple PDN connections and if the user equipment uses DSMIPv6 for mobility management, the user equipment uses DNS to discover the HA IP address(es) for the additional PDN connections after IKEv2 security association was established to the ePDG.

If the TIMEOUT_PERIOD_FOR_LIVENESS_CHECK attribute indicating the timeout period for the liveness check was included in a CFG_REPLY configuration payload and the user equipment has not received any cryptographically protected IKEv2 or IPSec message over the timeout period for the liveness check indicated in the TIMEOUT_PERIOD_FOR_LIVENESS_CHECK attribute, the user equipment sends an INFORMATIONAL request with no payloads. If an INFORMATIONAL response is not received for the INFORMATIONAL request, the user equipment deems the IKEv2 security association to have failed and discards all state associated with the IKEv2 security association and any IPSec security associations that were negotiated using the IKE security association.

Upon receipt of an IKE_AUTH request message from the user equipment requesting the establishment of a tunnel, the ePDG proceeds with a authentication and authorization, with further details are given below.

During the authentication and authorization procedure of the user equipment, the 3GPP AAA server provides to the ePDG an indication about the selected IP mobility mechanism.

The ePDG proceeds with IPsec tunnel setup completion and relays in the IKEv2 Configuration Payload (CFG_REPLY) of the final IKE_AUTH response message the remote IP address information to the user equipment. If NBM is used as IP mobility mechanism, the ePDG assigns either an IPv4 address or an IPv6 Home Network Prefix or both to the user equipment via a single CFG_REPLY Configuration Payload. If the user equipment requests for both IPv4 address and IPv6 prefix, but the ePDG only assigns an IPv4 address or an IPv6 Home Network Prefix due to subscription restriction or network preference, the ePDG includes the assigned remote IP address information (IPv4 address or IPv6 prefix) via a single CFG_REPLY Configuration Payload. If the ePDG assigns an IPv4 address, the CFG_REPLY comprises the INTERNAL_IP4_ADDRESS attribute. If the ePDG assigns an IPv6 Home Network Prefix, the CFG_REPLY comprises the INTERNAL_IP6_SUBNET configuration attribute. The ePDG obtains the IPv4 address and/or the IPv6 Home Network Prefix from the PDN GW (PGW). If the user equipment does not provide an APN to the ePDG during the tunnel establishment, the ePDG includes the default APN in the IDr payload of the IKE_AUTH response message. If the user equipment included the INTERNAL_IP6_DNS or the INTERNAL_IP4_DNS in the CFG_REQUEST Configuration payload, the ePDG includes the same attribute in the CFG_REPLY Configuration payload including zero or more DNS server addresses, according to IETF RFC 5996. If the user equipment included the P-CSCF_IP6_ADDRESS attribute, the P-CSCF_IP4_ADDRESS attribute or both in the CFG_REQUEST configuration payload, the ePDG may include one or more instances of the same attribute in the CFG_REPLY configuration payload as specified in IETF draft-gundavelli-ipsecme-3gpp-ims-options. If the user equipment included the TIMEOUT_PERIOD_FOR_LIVENESS_CHECK attribute indicating support of receiving timeout period for liveness check in the CFG_REQUEST configuration payload, the ePDG may include the TIMEOUT_PERIOD_FOR_LIVENESS_CHECK attribute indicating the timeout period for the liveness check in the CFG_REPLY configuration payload.

If DSMIPv6 is used as IP mobility mechanism, depending on the information provided by the user equipment in the CFG_REQUEST payload the ePDGs assign to the user equipment either a local IPv4 address or local IPv6 address (or a local IPv6 prefix) via a single CFG_REPLY Configuration Payload. If the ePDG assigns a local IPv4 address, the CFG_REPLY comprises the INTERNAL_IP4_ADDRESS attribute. If the ePDG assigns a local IPv6 address or a local IPv6 prefix the CFG_REPLY comprises correspondingly the INTERNAL_IP6_ADDRESS or the INTERNAL_IP6_SUBNET attribute. If the user equipment provided an APN to the ePDG during the tunnel establishment, the ePDG does not change the provided APN and includes the APN in the IDr payload of the IKE_AUTH response message. An IPsec tunnel is now established between the user equipment and the ePDG.

If NBM is used and if the ePDG needs to reject a PDN connection, e.g. due to specific conditions, the network policies, or the ePDG capabilities to indicate that no more PDN connection request of the given APN can be accepted for the user equipment, the ePDG includes, in the IKE_AUTH response message, a Notify Payload with a Private Notify Message Type PDN_CONNECTION_REJECTION. Additionally if the IKE_AUTH request message from the user equipment indicated Handover Attach, the Notification Data field of the Notify Payload includes the IP address information from the Handover Attach indication. If the user equipment indicated Initial Attach, the Notification Data field is omitted. If the ePDG needs to reject a PDN connection due to the network policies or capabilities to indicate that no more PDN connection request with any APN can be accepted for the user equipment, the ePDG includes in the IKE_AUTH response message containing the IDr payload a Notify Payload with a Private Notify Message Type MAX_CONNECTION_REACHED. If the ePDG determines that the user equipment is not allowed to access EPC, the ePDG includes, in the IKE_AUTH response message, a Notify Payload with a Notify Message Type AUTHENTICATION_FAILED.

If the user equipment indicates Handover Attach by including the previously allocated home address information and the ePDG obtains one or more PDN GW identities from the 3GPP AAA server, the ePDG uses these identified PDN Gws in the subsequent PDN GW selection process. If the user equipment indicates Initial Attach i.e. home address information not included, the ePDG may run its initial PDN GW selection process to determine the PDN GW without using the received PDN GW identities.

The ePDG supports IPSec ESP in order to provide secure tunnels between the user equipment and the ePDG.

During the IKEv2 authentication and tunnel establishment, if the user equipment requested the HA IP address(es) and if DSMIPv6 was chosen and if the HA IP address(es) are available, the ePDG provides the HA IP address(es) (IPv6 address and optionally IPv4 address) for the corresponding APN as specified by the "IDr" payload in the IKE_AUTH request message by including in the CFG_REPLY Configuration Payload a HOME_AGENT_ADDRESS attribute. In the CFG_REPLY, the ePDG sets respectively the IPv6 Home Agent address field and optionally the IPv4 Home Agent address field of the HOME_AGENT_ADDRESS attribute to the IPv6 address of the HA and to the IPv4 address of the HA. If no IPv4 HA address is available at the ePDG or if it was not requested by the user equipment, the ePDG omits the IPv4 Home Agent Address field. If the ePDG is not able to provide an HA address for the corresponding APN, then the ePDG does not include a HOME_AGENT_ADDRESS attribute in the CFG_REPLY.

The ePDG may support multiple authentication exchanges in the IKEv2 protocol in order to support additional authentication and authorization of the user equipment with an external AAA server.

If the ePDG supports authentication and authorization of the user equipment with an external AAA server, on receipt of an IKE_SA_INIT message the ePDG includes a Notify payload of type "MULTIPLE_AUTH_SUPPORTED" in the IKE_SA_INIT response message to the user equipment.

On successful completion of authentication and authorization procedure of the user equipment accessing EPC and on receipt of an IKE_AUTH request containing a Notify payload of type "ANOTHER_AUTH_FOLLOWS", the ePDG sends an IKE_AUTH response containing the "AUTH" payload.

Upon receipt of a subsequent IKE_AUTH request from the user equipment comprising the user identity in the private network within the "IDi" payload, the ePDG performs the following:

If PAP authentication is required, then the ePDG sends an EAP-GTC request to the user equipment within an IKE_AUTH response message. Upon receipt of an EAP-GTC response from the user equipment, the ePDG authenticates the user (user equipment) with the external AAA server.

If CHAP authentication is required, then the ePDG sends an EAP MD5-Challenge request to user equipment. Upon receipt of an EAP MD5-Challenge response within an IKE_AUTH request message from the user equipment, the ePDG authenticates the user (user equipment) with the external AAA server. If the ePDG receives Legacy-Nak response comprising EAP-GTC type from the user equipment the ePDG may change the authentication and authorization procedure. If the ePDG does not change the authentication and authorization procedure or if the ePDG receives a Legacy-Nak response not comprising EAP-GTC, the ePDG sends EAP-Failure to the user equipment.

The general signalling flows for authentication and authorization with an external AAA server.

In general terms, the requirements of IETF RFC 5996 apply to this embodiment.

The TIMEOUT_PERIOD_FOR_LIVENESS_CHECK attribute according to this embodiment shown in FIG.

Figure 10:
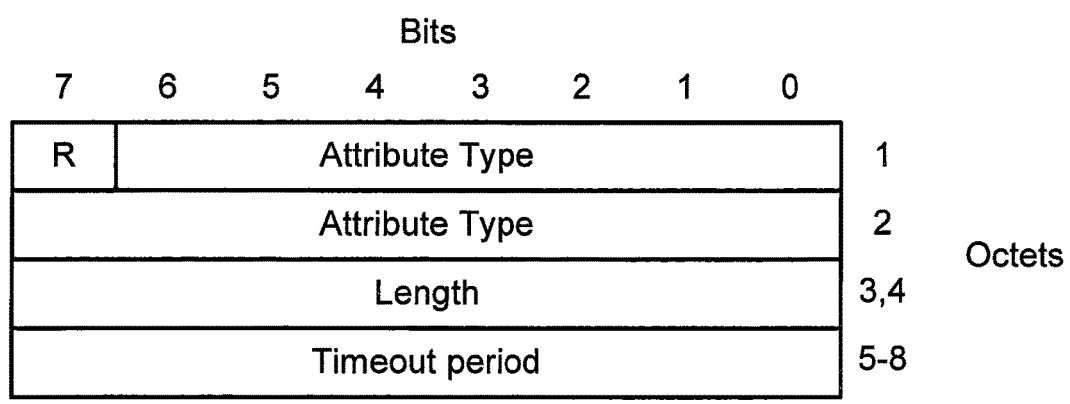
FIG. 10 is a schematic illustration of a timeout period for liveness check attribute according to an embodiment.

In FIG. 10 the entries of the attribute are encoded as follows: The R bit in the first octet. The attribute type field indicating the TIMEOUT_PERIOD_FOR_LIVENESS_CHECK is of the value xx. The length field is set to zero or four. If the length field is set to zero, the timeout period field is not included. If the timeout period field is not included, it indicates support of receiving timeout period for liveness check. If the timeout period field is included, the timeout period field indicates the timeout period for the liveness check in seconds.

In this embodiment the tunnel end point in the network is the ePDG. As part of the tunnel establishment attempt the use of a certain APN is requested. When a new attempt for tunnel establishment is performed by the UE the UE uses IKEv2. The authentication of the UE in its role as IKEv2 initiator terminates in the 3GPP AAA Server. The UE sends EAP messages over IKEv2 to the ePDG. The ePDG extracts the EAP messages received from the UE over IKEv2, and sends them to the 3GPP AAA Server. The UE uses the Configuration Payload of IKEv2 to obtain the Remote IP address.

In the below, the EAP-AKA message parameters and procedures regarding authentication are omitted; only decisions and processes relevant to the use of EAP-AKA within IKEv2 are disclosed.

Figure 9:
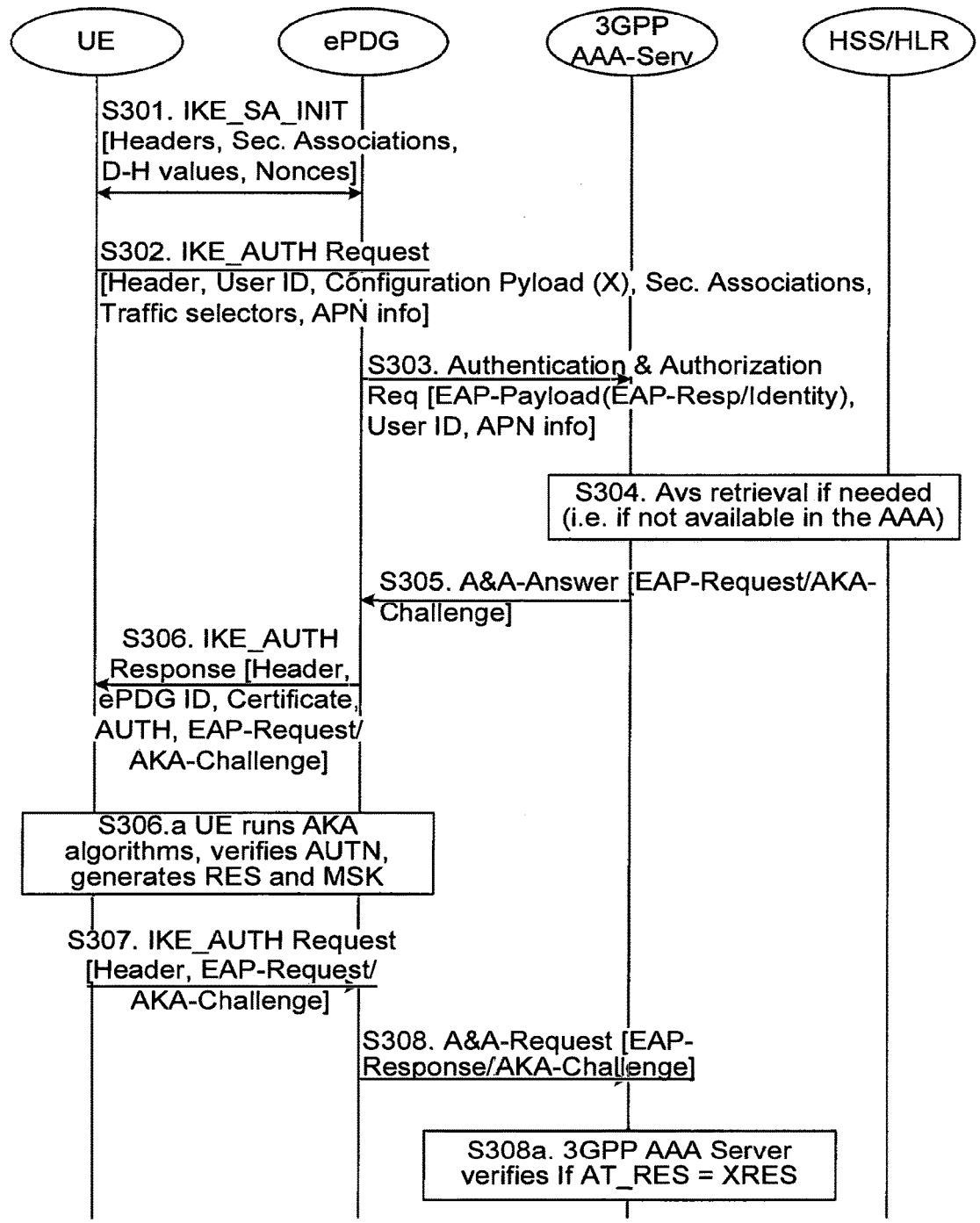
FIGS. 9A and 9B illustrate a signalling diagram according to some embodiments.
Figure 9B:
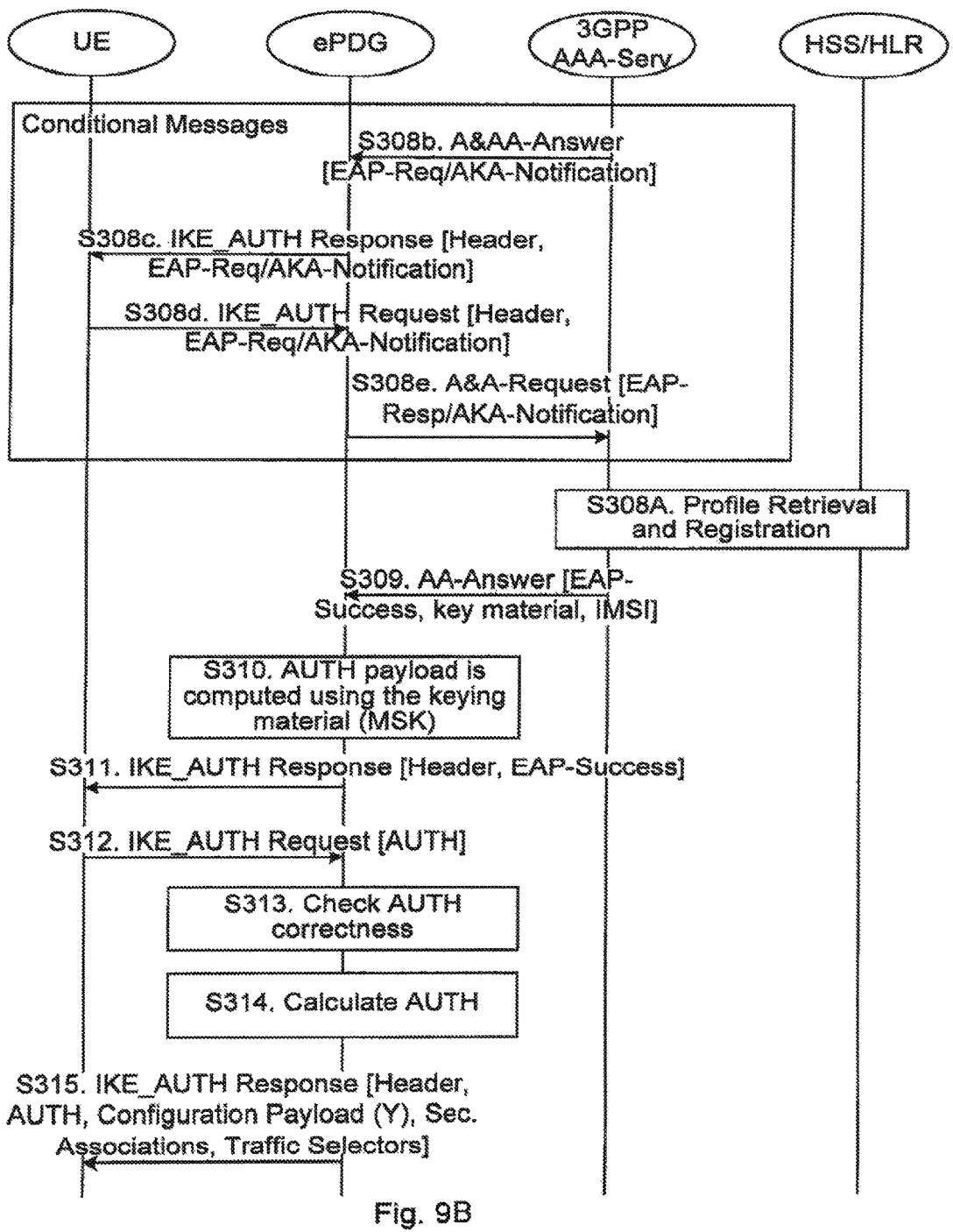

The message flow for the full authentication is illustrated in the signalling diagram of FIGS. 9A and 9B.

As the user equipment and ePDG generate nonces as input to derive encryption and authentication keys in IKEv2, replay protection is provided. For at least this reason, there is no need for the 3GPP AAA Server to request the user identity again using the EAP-AKA specific methods, because the 3GPP AAA Server is certain that no intermediate node has modified or changed the user identity.

S301. The UE and the ePDG exchange a first pair of messages, known as IKE_SA_INIT, in which the ePDG and UE negotiate cryptographic algorithms, exchange nonces and perform a Diffie_Hellman exchange. In the signalling diagram of FIGS. 9A and 9B, the attribute X in step S301 represents a configuration attribute indicating support of receiving a timeout period for liveness check.

S302. The UE sends the user identity (in the IDi payload) and the APN information (in the IDr payload) in this first message of the IKE_AUTH phase, and begins negotiation of child security associations. The UE omits the AUTH parameter in order to indicate to the ePDG that it wants to use EAP over IKEv2. The user identity is compliant with a Network Access Identifier (NAI) format, containing the IMSI or the pseudonym, as defined for EAP-AKA. The UE sends the configuration payload (CFG_REQUEST) within the IKE_AUTH request message to obtain an IPv4 and/or IPV6 home IP Address and/or a Home Agent Address.

S303. The ePDG sends the Authentication and Authorization Request message to the 3GPP AAA Server, containing the user identity and APN. The UE uses the NAI; the 3GPP AAA server identifies, based on the realm part of the NAI, that combined authentication and authorization is being performed for tunnel establishment with an ePDG which allows only EAP-AKA (and not an I-WLAN PDG, which would allow also EAP-SIM). The different Diameter application IDs will help the 3GPP AAA Server distinguish among authentications for trusted access (which requires EAP-AKA authentication), and authentications for tunnel setup in EPS (which allows only EAP-AKA).

S304. The 3GPP AAA Server fetches the authentication vectors from the HSS/HLR (if these parameters are not available in the 3GPP AAA Server). The 3GPP AAA Server performs a lookup of the IMSI of the authenticated user (UE) based on the received user identity (root NAI or pseudonym) and includes the EAP-AKA as requested authentication method in the request sent to the HSS. The HSS then generates authentication vectors with AMF separation bit=0 and sends them back to the 3GPP AAA server.

S305. The 3GPP AAA Server initiates the authentication challenge. The user identity is not requested again.

S306. The ePDG responds with its identity, a certificate, and sends the AUTH parameter to protect the previous message it sent to the UE (in the IKE_SA_INIT exchange). The EAP message received from the 3GPP AAA Server (EAP-Request/AKA-Challenge) is included in order to start the EAP procedure over IKEv2.

S307. The UE checks the authentication parameters and responds to the authentication challenge. The only payload (apart from the header) in the IKEv2 message is the EAP message.

S308. The ePDG forwards the EAP-Response/AKA-Challenge message to the 3GPP AAA Server.

S308.a The 3GPP AAA Server checks if the authentication response is correct.

S308.b-e If dynamic IP mobility selection is executed embedded to the authentication and authorization, the selected mobility mode is sent to the user (UE) in an AKA-Notification request, over Diameter A&A answer and IKE_AUTH message. The UE responds to this over IKEv2 and the ePDG forwards the response to the 3GPP AAA Server.

S308A. The 3GPP AAA Server initiates the Subscriber Profile Retrieval and 3GPP AAA Server registration to the HSS. The 3GPP AAA Server checks in the subscription of the user equipment if the user is authorized for non-3GPP access.

S309. When all checks are successful, the 3GPP AAA Server sends a final Authentication and Authorization Answer (with a result code indicating success) including the relevant service authorization information, an EAP success and the key material to the ePDG. This key material comprises the MSK generated during the authentication process. When the SWm and SWd interfaces between the ePDG and the 3GPP AAA Server are implemented using Diameter, the MSK is encapsulated in the EAP-Master-Session-Key-AVP.

S310. The MSK is used by the ePDG to generate the AUTH parameters in order to authenticate the IKE_SA_INIT phase messages. These two first messages had not been authenticated before as there was no key material available yet. The shared secret generated in an EAP exchange (the MSK), when used over IKEv2, is used to generated the AUTH parameters.

S311. The EAP Success/Failure message is forwarded to the user equipment over IKEv2.

S312. The user equipment takes its own copy of the MSK as input to generate the AUTH parameter to authenticate the first IKE_SA_INIT message. The AUTH parameter is sent to the ePDG.

S313. The ePDG checks the correctness of the AUTH received from the user equipment. At this point the user equipment is authenticated. If case S2b is used, PMIP signalling between ePDG and PDN GW can now start. The ePDG continues with the next step in the procedure described here only after successful completion of the PMIP binding update procedure.

S314. The ePDG calculates the AUTH parameter which authenticates the second IKE_SA_INIT message. The ePDG sends the assigned Remote IP address in the configuration payload (CFG_REPLY).

S315. The AUTH parameter is sent to the UE together with the configuration payload, security associations and the rest of the IKEv2 parameters and the IKEv2 negotiation terminates. In the signalling diagram of FIGS. 9A and 9B, the attribute Y in step S315 represents a configuration attribute indicating a timeout period for the liveness check.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuration of liveness check using Internet key exchange messages, the method being performed by a user equipment, the method comprising:
   transmitting, from the user equipment over an air interface to a core network node, a first Internet key exchange message comprising a first configuration attribute, including a length field set to zero, indicating support of receiving a timeout period for a liveness check, wherein the liveness check is part of an Internet key exchange security association;
   receiving, at the user equipment over the air interface from the core network node, a second Internet key exchange message comprising a second configuration attribute indicating the timeout period for the liveness check;
   transmitting an informational request with no payload when the timeout period for the liveness check is included in the second configuration attribute, and in an absence of receiving a cryptographically protected Internet protocol security (IPSec) packet or a cryptographically protected Internet key exchange packet during the timeout period for the liveness check; and
   in an absence of receiving an informational response in response to the transmitted informational request with no payload, at least one of,
      determining failure of the Internet key exchange security association,
      discarding any state information associated with the Internet key exchange security association, and
      discarding any Internet protocol security (IPSec) security associations negotiated using the Internet key exchange security association.

2. The method according to claim 1, wherein the first Internet key exchange message is an Internet Key Exchange Authentication (IKE_AUTH) request message.

3. The method according to claim 1, wherein the second Internet key exchange message is an Internet Key Exchange Authentication (IKE_AUTH) response message.

4. The method according to claim 1, wherein the first configuration attribute is provided in a Configuration Request (CFG_REQUEST) configuration payload.

5. The method according to claim 1, wherein the second configuration attribute is provided in a Configuration Reply (CFG_REPLY) configuration payload.

6. The method according to claim 1, wherein the second configuration attribute is based on a local policy.

7. The method according to claim 1, wherein the second configuration attribute is based on information from a configuration system or management system.

8. The method according to claim 1, further comprising:
   performing the liveness check by the user equipment according to the second configuration attribute indicating the timeout period for the liveness check received from the network node.

9. The method of claim 8 wherein performing the liveness check comprises transmitting an informational request message from the user equipment over the air interface to the core network node according to the second configuration attribute indicating the timeout period for the liveness check.

10. The method according to claim 1, wherein the first Internet key exchange message is transmitted in an Internet key exchange version 2 (IKEv2) message, and wherein the second Internet key exchange message is received in an IKEv2 message.

11. The method according to claim 1, wherein the second configuration attribute of the second Internet key exchange message comprises an indication that the user equipment is required to transmit an informational request responsive to the user equipment receiving at least one of a cryptographically protected Internet protocol security (IPSec) packet and a cryptographically Internet key exchange packet during the timeout period.

12. The method according to claim 11, wherein the informational request is included in an Internet key exchange version 2 (IKEv2) INFORMATIONAL request message.

13. The method according to claim 11, wherein said liveness check is part of an Internet key exchange security association, and wherein the user equipment does not transmit any cryptographically protected IPSec packet or cryptographic Internet key exchange packet as part of the Internet key exchange security association during said timeout period.

14. The method according to claim 1, wherein the first Internet key exchange message is transmitted in an Internet key exchange version 1 (IKEv1) message and wherein the second Internet key exchange message is received in an IKEv1 message.

15. The method according to claim 1, wherein the second configuration attribute of the second Internet key exchange message comprises an indication that the user equipment is required to transmit an are-you-there message responsive to the user equipment receiving at least one of a cryptographically protected Internet protocol security (IPSec) packet and a cryptographically Internet key exchange packet during the timeout period.

16. The method according to claim 15, wherein the are-you-there message is included in Request for Comment (RFC) 3706 defined are-you-there (R-U-THERE) message.

17. The method according to claim 1, wherein the second configuration attribute of the second Internet key exchange message comprises an indication that the user equipment is not required to transmit an informational request responsive to the user equipment receiving at least one of a cryptographically protected Internet protocol security (IPSec) packet and a cryptographic Internet key exchange packet during the timeout period.

18. The method according to claim 1, wherein the second configuration attribute of the second Internet key exchange message comprises an indication that the user equipment is not required to transmit an are-you-there message responsive to the user equipment receiving at least one of a cryptographically protected Internet protocol security (IPSec) packet and a cryptographic Internet key exchange packet during the timeout period.

19. A user equipment for configuration of liveness check using Internet key exchange messages, the user equipment comprising:
 a processing unit and memory, the processing unit being configured to cause the user equipment to:
  transmit, from the user equipment over an air interface to a core network node, a first Internet key exchange message comprising a first configuration attribute, including a length field set to zero, indicating support of receiving a timeout period for liveness check, wherein the liveness check is part of an Internet key exchange security association;
  receive, at the user equipment over the air interface from the core network node, a second Internet key exchange message comprising a second configuration attribute indicating the timeout period for the liveness check;
  transmit an informational request with no payload when the timeout period for the liveness check is included in the second configuration attribute, and in an absence of receiving a cryptographically protected Internet protocol security (IPSec) packet or a cryptographically protected Internet key exchange packet during the timeout period for the liveness check; and
  in an absence of receiving an informational response in response to the transmitted informational request with no payload, at least one of,
   determine failure of the Internet key exchange security association,
   discard any state information associated with the Internet key exchange security association, and
   discard any Internet protocol security (IPSec) security associations negotiated using the Internet key exchange security association.

20. The user equipment according to claim 19, wherein the processing unit is further configured to cause the user equipment to:
 perform the liveness check by the user equipment according to the second configuration attribute indicating the timeout period for the liveness check received from the network node.

21. The user equipment according to claim 20 wherein performing the liveness check comprises transmitting an informational request message from the user equipment over the air interface to the core network node according to the second configuration attribute indicating the timeout period for the liveness check.

22. A computer program product comprising a non-transitory computer readable medium storing computer program code for configuration of liveness check using Internet key exchange messages, the computer program code which, when run on a processing unit of a user equipment, causes the user equipment to:
 transmit, from the user equipment over an air interface to a core network node, a first Internet key exchange message comprising a first configuration attribute, including a length field set to zero, indicating support of receiving a timeout period for liveness check, wherein the liveness check is part of an Internet key exchange security association;
 receive, at the user equipment over the air interface from the core network node, a second Internet key exchange message comprising a second configuration attribute indicating the timeout period for the liveness check;
 transmit an informational request with no payload when the timeout period for the liveness check is included in the second configuration attribute, and in an absence of receiving a cryptographically protected Internet protocol security (IPSec) packet or a cryptographically protected Internet key exchange packet during the timeout period for the liveness check; and
 in an absence of receiving an informational response in response to the transmitted informational request with no payload, at least one of,
  determine failure of the Internet key exchange security association,
  discard any state information associated with the Internet key exchange security association, and
  discard any Internet protocol security (IPSec) security associations negotiated using the Internet key exchange security association.

23. The computer program product according to claim 22, wherein the computer program code which, when run on the processing unit of the user equipment, further causes the user equipment to:

perform the liveness check by the user equipment according to the second configuration attribute indicating the timeout period for said liveness check received from the network node.

24. The computer program product according to claim 23 wherein performing the liveness check comprises transmitting an informational request message from the user equipment over the air interface to the core network node according to the second configuration attribute indicating the timeout period for the liveness check.

* * * * *

UNITED STATES PATENT AND TRADEMARK OFFICE
CERTIFICATE OF CORRECTION

PATENT NO. : 9,800,404 B2  
APPLICATION NO. : 14/441684  
DATED : October 24, 2017  
INVENTOR(S) : Sedlacek et al.

Page 1 of 1

It is certified that error appears in the above-identified patent and that said Letters Patent is hereby corrected as shown below:

On the Title Page

In Item (72), under "Inventors", in Column 1, Line 1, delete "Hovorcovice" and insert -- Hovorčovice --, therefor.

In the Specification

In Column 3, Line 48, delete "embodiments; and" and insert -- embodiments; --, therefor.

In Column 5, Line 13, delete "POW" and insert -- PGW --, therefor.

In Column 7, Line 30, delete "medium 83." and insert -- medium 33. --, therefor.

In Column 8, Lines 52-53, delete "core network node 11." and insert -- core network node 12. --, therefor.

In Column 10, Line 38, delete "Message." and insert -- message. --, therefor.

In Column 17, Line 49, delete "FIG." and insert -- FIG. 10. --, therefor.

Signed and Sealed this  
Twenty-third Day of January, 2018

Joseph Matal  
*Performing the Functions and Duties of the  
Under Secretary of Commerce for Intellectual Property and  
Director of the United States Patent and Trademark Office*